United States Patent Office 3,054,768
Patented Sept. 18, 1962

3,054,768
PROCESS COMPRISING BLENDING A HALOGENATED POLYMER WITH AN ALKYL BENZENE
James Maurice Quinn, Tonawanda, N.Y., assignor to E. I. du Pont de Nemours and Company, Wilmington, Del., a corporation of Delaware
No Drawing. Filed Oct. 21, 1958, Ser. No. 768,561
6 Claims. (Cl. 260—33.6)

This invention relates to the manufacture of shaped articles of polymeric halogenated hydrocarbons. More specifically, it relates to the stabilization of the polymeric halogenated hydrocarbons, particularly above their melting temperatures, for successful shaping into articles.

The invention will be described as it applies to polyvinyl chloride or copolymers of vinyl chloride having vinyl chloride as the major constituent, and their formation into films for use in packaging applications and the like. However, the invention is equally applicable to polymers and copolymers of vinyl fluoride and may be extended to include all polymeric materials whose thermal decomposition is at least partially attributed to the loss of halogen acid from the composition, thereby leading to discoloration; and the shaping of these polymeric materials into films, filaments, fibers, foils, coatings, etc. Besides polyvinyl chloride and polyvinyl fluoride, the invention applies to such polymeric materials as vinylidene chloride polymers, vinylidene chloride-vinyl chloride copolymers, vinylidene chloride-acrylonitrile copolymers, vinylidene fluoride polymers and copolymers, after-chlorinated polyvinyl chloride, chloroprene polymers, chlorosulfonated polyethylene, and the like.

Polyvinyl chloride is characterized by poor thermal stability, particularly at temperatures above its melting point. Thermal decomposition is evidenced by a browning of the normally white polymer. As degradation continues the polymer becomes progressively darker until charring and substantial degradation occur. This lack of thermal stability presents a serious obstacle to the commercial exploitation of the polymer since the preferred methods of forming shaped structures involve the use of heat.

The object of the present invention is a substantially stabilized polymer that can be formed into shaped structures at elevated temperatures, e.g., by melt or plasticized extrusion, rolling, coalescence or solvent casting, without encountering the aforementioned difficulties. A further object is a polyvinyl chloride composition that can easily be melt-extruded into a useful film. Other objects will appear hereinafter.

The objects are accomplished by a composition of matter comprising the halogenated hydrocarbon polymer and 1–15% by weight of at least one alkyl substituted benzene having 2–6 alkyl substitutions, said alkyl groups having 1–4 carbon atoms, said alkyl substituted benzene having a molecular weight greater than 106 (at least 107) and a normal boiling point of at least 160° C. The upper limit on molecular weight is 414 which represents a fully substituted benzene having attached alkyl groups of 4 carbon atoms each $C_6(C_4H_9)_6$. When the alkyl groups are all methyl (one carbon atom), then it is preferred that at least 3 substitutions on the benzene structure are present. When at least one of the alkyl groups has two or more carbon atoms, then two to six substitutions may be present. The preferred halogenated hydrocarbon polymers are those in which the halogen has an atomic weight of 19–36.

The substituted benzene compounds must have a boiling point of at least about 160° C. in order to remain present at the temperatures ordinarily used in preparing shaped structures of polyvinyl chloride. The alkyl substituted benzene compounds preferred in the present invention are selected from the group consisting of hemimellitene (1,2,3-trimethylbenzene), pseudocumene (1,2,4-trimethylbenzene), mesitylene (1,3,5-trimethylbenzene), prehnitene (1,2,3,4-tetramethylbenzene), durene (1,2,4,5-tetramethylbenzene), pentamethylbenzene, hexamethylbenzene, p-cymene (4-isopropyl-1-methylbenzene), 1,2-diethylbenzene, 1,4-diisopropylbenzene and 1,3,5-triethylbenzene. The structural formulae of these compounds are given below:

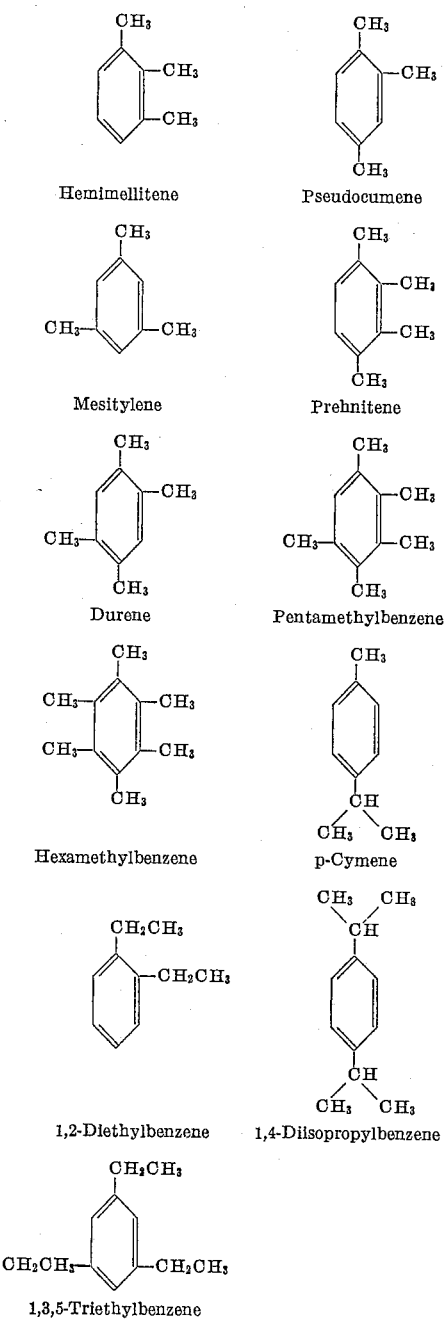

The amount of the alkyl substituted benzene stabilizer used, particularly for the melt-extrusion of polyvinyl chloride films, should be enough to provide adequate thermal stability during the forming operation but not enough to affect the properties of the resulting film adversely. Concentrations of at least 1% of the stabilizer, based on the weight of the stabilizer plus polymer, have been found most useful. The maximum used will depend on the process of forming the shaped structures. However, the maximum concentration of the stabilizer remaining in the ultimate product is preferably no greater than 15%. For extrusion operations where only a minor portion of the stabilizer would be lost by evaporation during the forming operation, up to 15% may therefore be used in the starting mixture. In solvent casting, dispersion coalescence, or plasticized extrusion, where a larger proportion of the stabilizer may be evaporated during formation of the shaped structure, a still higher concentration, e.g., up to 25%, may be used in the starting composition.

Besides improving thermal stability and lowering the melt viscosity of the polymeric halogenated hydrocarbons, the stabilizer compounds of the compositions of this invention provide other advantages. They are substantially inert chemically to normal compounding ingredients. They are compatible with the polymers over a wide range of compositions and therefore can be easily mixed uniformly with the polymers; also they show no tendency to exude to the surface of the ultimately produced polymeric articles. Thus, they do not interfere with post-processing operations such as printing. These compounds are essentially insoluble in water so that the final articles are not rendered water-sensitive by their presence. Most important, the films produced are substantially clear, being virtually bubble-free and particle-free.

The process for forming shaped structures involves blending a mixture of the halogenated hydrocarbon polymer and the alkyl substituted benzene having 2–6 alkyl substitutions, each alkyl group having 1–4 carbon atoms; then heating the mixture until it is converted into a homogeneous single phase composition; and, thereafter, forming the homogeneous single phase into a shaped structure and cooling the structure.

Specific embodiments falling within the definition of the process and composition of the invention will be apparent from the following examples. It is understood that the examples should not be considered to limit the scope of the present invention. In the examples, all parts are by weight unless otherwise specified.

*Example I*

A mixture consisting of 90 parts (weight basis) of a polyvinyl chloride resin (the resin having an inherent viscosity of 1.21 deciliters per gram measured at 0.25% concentration in hexamethylphosphoramide at 30° C.) and 10 parts of mesitylene (1,3,5-trimethylbenzene) was prepared by ball milling the ingredients together for 60 minutes. A one gram sample of this mixture was pressed for 5 minutes between ferrotype plates under a total force of 30 tons in a Carver laboratory press heated to 210° C. The film was clear and substantially free of bubbles and particles, and had a slight yellowish cast in 10 mil thickness when viewed against a source of white light.

As a control, the mesitylene was omitted. A one gram sample of the same polyvinyl chloride resin as above was pressed between ferrotype plates under a total force of 30 tons at 210° C. for 4 minutes. When examined, the sample had been converted to a brownish-black, charred, nearly opaque film containing numerous black particles.

*Example II*

A mixture consisting of 90 parts of the polyvinyl chloride resin, 8 parts of mesitylene and 2 parts of "Lubricin" V–3 [1] lubricant was prepared. The mixture was melted and extruded at a temperature of 195° C. through a conventional one-inch diameter extruder using a six-inch wide flat die at a throughput rate of 12 pounds per hour. The film produced was transparent, substantially free of bubbles and particles, and had only a slight yellow brown cast when viewed in 10 mil thickness against a source of

[1] A modified castor oil consisting principally of glyceryl triricinoleate manufactured by the Baker Castor Oil Co.

white light. Its tensile strength was 7000 p.s.i., the elongation was 266% and the modulus was 276,000 p.s.i.

In a control experiment showing the effect of using no stabilizer, a mixture of 98 parts of the same polyvinyl chloride resin as used above with 2 parts of "Lubricin" V–3 was fed into the extruder heated to 205° C. The mixture was converted to a bubbly, black mass part way through the heated zone of the extruder and could not be extruded due to plugging of the equipment. Essentially the same results were obtained in other attempted experiments using this mixture at extrusion temperatures ranging from 185° C. to 230° C. Below 185° C. the polyvinyl chloride resin did not coalesce.

*Example III*

A mixture consisting of 90 parts polyvinyl chloride resin and 10 parts hexamethylbenzene was prepared by ball milling the ingredients together as in Example I. A one-gram sample of this mixture was pressed for 6 minutes between ferrotype plates under a total force of 30 tons in a Carver laboratory press heated to 210° C. The film was clear and substantially free of bubbles and particles, but had a somewhat brownish cast in 10 mil thickness when viewed against a source of white light.

*Example IV*

A mixture of 90 parts polyvinyl chloride resin and 10 parts 1,4-diisopropylbenzene was prepared as in Example I. A one-gram sample of this mixture was pressed for 6 minutes between ferrotype plates under a total force of 30 tons in a Carver laboratory press heated to 210° C. The film was clear and substantially free of bubbles and particles.

*Examples V–XI*

Example I was repeated using 90 parts of the polyvinyl chloride resin and 10 parts of the compounds listed below:

| Example: | Compound |
|---|---|
| V | 1,2,3-trimethylbenzene. |
| VI | 1,2,4-trimethylbenzene. |
| VII | 1,2,3,4-tetramethylbenzene. |
| VIII | 1,2,4,5-tetramethylbenzene. |
| IX | 4-isopropyl-1-methylbenzene. |
| X | 1,2-diethylbenzene. |
| XI | 1,3,5-triethylbenzene. |

In all the examples, a clear film substantially free of bubbles and particles was produced.

The compositions of this invention are useful in the preparation of shaped structures of all types. They are extremely useful in preparing films, filaments, fibers, foils and the like and as coatings for wood, metals, etc. However, their greatest utility is in the formation of self-supporting films for packaging applications. These films may be fabricated into sheets, envelopes, or tubes and used to package hardware items, greased or untreated machine parts and similar materials. In sheet form the film may be used as a base for adhesive tape, sound recording tape, etc.

The invention contemplates the use of the specified alkyl substituted benzene compounds as the essential additives to polymeric compositions. These compounds may be used singly or in mixtures thereof.

It is believed that these benzenoid compounds are capable of providing labile alkyl free radicals upon pyrolysis. It is theorized that the interaction of these radicals with the polymer is the basis for the stabilizing action of the additives.

The present invention also contemplates the use of other ingredients along with the essential aromatic additives provided such ingredients do not detract from the function of the aromatic additives. Thus, the addition of pigments, dyes, delusterants, plasticizers, latent solvents, fillers, lubricants, other thermal stabilizers, photo stabilizers, etc., is understood to be within the purview of this invention.

What is claimed is:

1. A process for forming shaped structures which comprises blending a mixture of a halogenated polymer of a vinylidene monomer in which the halogen has an atomic weight of 19–36 and 1–25% by weight of at least one polyalkyl substituted benzene having 2 through 6 alkyl groups substituted thereon, said alkyl groups having 1 through 4 carbon atoms, and having a molecular weight of at least 107; heating said mixture to a temperature above the melting point of said polymer sufficient to convert the mixture into a homogeneous single phase composition containing polymer and a sufficient amount of said polyalkyl substituted benzene to prevent degradation of said polymer; forming said composition into a shaped structure while retaining a sufficient amount of said polyalkyl substituted benzene in said composition to prevent degradation of said polymer; and cooling said structure.

2. A process as in claim 1 wherein said polymer is polyvinyl chloride.

3. A proces as in claim 1 wherein said polyalkyl substituted benzene is 1,3,5-trimethylbenzene.

4. A process as in claim 1 wherein said polyalkyl substituted benzene is hexamethylbenzene.

5. A process as in claim 1 wherein said polyalkyl substituted benzene is 1,4-diisopropylbenzene.

6. A process for forming a self-supporting film which comprises blending a mixture of polyvinyl chloride and 1–15% by weight of at least one polyalkyl substituted benzene compound selected from the group consisting of 1,2,3-trimethylbenzene, 1,2,4-trimethylbenzene, 1,3,5-trimethylbenzene, 1,2,3,4-tetramethylbenzene, 1,2,4,5-tetramethylbenzene, pentamethylbenzene hexamethylbenzene, 4-isopropyl-1-methylbenzene, 1,2-diethylbenzene, 1,4-diisopropylbenzene and 1,3,5-triethylbenzene; heating said mixture to a temperature above the melting point of said polyvinyl chloride sufficient to convert the mixture into a homogeneous single phase composition containing polyvinyl chloride and a sufficient amount of said polyalkyl substituted benzene compound to prevent degradation of said polyvinyl chloride; extruding said composition in the form of a film while retaining a sufficient amount of said polyalkyl substituted benzene compound in said composition to prevent degradation of said polyvinyl chloride; and cooling said film.

References Cited in the file of this patent

UNITED STATES PATENTS

| | | |
|---|---|---|
| 2,338,948 | Kummel | Jan. 11, 1944 |
| 2,474,896 | Hauser | July 5, 1949 |
| 2,705,690 | Nelson et al. | Apr. 5, 1955 |
| 2,844,557 | Welch | July 22, 1958 |
| 2,865,874 | Christenson | Dec. 23, 1958 |
| 2,913,430 | Roeser | Nov. 17, 1959 |